(12) United States Patent
Totani et al.

(10) Patent No.: US 11,630,241 B2
(45) Date of Patent: Apr. 18, 2023

(54) POLYCARBONATE RESIN LENS AND POLYCARBONATE RESIN COMPOSITION

(71) Applicant: MITSUI CHEMICALS, INC., Tokyo (JP)

(72) Inventors: Yoshiyuki Totani, Ichihara (JP); Kiyohiro Saito, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 642 days.

(21) Appl. No.: 16/614,631

(22) PCT Filed: May 18, 2018

(86) PCT No.: PCT/JP2018/019364
§ 371 (c)(1),
(2) Date: Nov. 18, 2019

(87) PCT Pub. No.: WO2018/212343
PCT Pub. Date: Nov. 22, 2018

(65) Prior Publication Data
US 2020/0200945 A1 Jun. 25, 2020

(30) Foreign Application Priority Data
May 19, 2017 (JP) .............................. JP2017-099723

(51) Int. Cl.
| G02B 1/04 | (2006.01) |
| C08K 5/00 | (2006.01) |
| C08K 5/3417 | (2006.01) |
| C08K 5/3475 | (2006.01) |
| C08L 69/00 | (2006.01) |

(52) U.S. Cl.
CPC .............. *G02B 1/041* (2013.01); *C08K 5/005* (2013.01); *C08K 5/0041* (2013.01); *C08K 5/3417* (2013.01); *C08K 5/3475* (2013.01); *C08L 69/00* (2013.01); *C08L 2201/08* (2013.01); *C08L 2201/10* (2013.01)

(58) Field of Classification Search
None
See application file for complete search history.

(56) References Cited

U.S. PATENT DOCUMENTS

| 5,296,519 A | 3/1994 | Otsuka |
| 5,401,438 A | 3/1995 | Otsuka |
| 5,952,096 A * | 9/1999 | Yamashita .............. G02B 1/041 524/84 |
| 6,117,370 A | 9/2000 | Hasegawa et al. |
| 9,207,368 B2 | 12/2015 | Tamura et al. |
| 9,746,595 B2 | 8/2017 | Nagaya et al. |
| 9,868,665 B2 | 1/2018 | Machida et al. |
| 2013/0194658 A1 | 8/2013 | Tamura et al. |
| 2015/0285971 A1 | 10/2015 | Nagaya et al. |
| 2016/0060160 A1 | 3/2016 | Machida et al. |
| 2017/0051146 A1* | 2/2017 | Ishizuka ................. C08L 69/00 |
| 2018/0044228 A1 | 2/2018 | Machida et al. |

FOREIGN PATENT DOCUMENTS

| JP | H04134065 A | 5/1992 |
| JP | H04292661 A | 10/1992 |
| JP | H05212103 A | 8/1993 |
| JP | H06161128 A | 6/1994 |
| JP | H09263694 A | 10/1997 |
| JP | 2000206323 A | 7/2000 |
| JP | 2004325511 A | 11/2004 |
| JP | 2004352828 A | 12/2004 |
| JP | 2004352829 A | 12/2004 |
| JP | 2006241410 A | 9/2006 |
| JP | 2012058643 A | 3/2012 |
| JP | 2012206305 A | 10/2012 |
| JP | 2013054275 A | 3/2013 |
| JP | 2015189933 A | 11/2015 |
| JP | 2017014402 A | 1/2017 |
| WO | 2014002864 A1 | 1/2014 |

OTHER PUBLICATIONS

International Search Report (PCT/ISA/210) and translation and Written Opinion (PCT/ISA/237) dated Aug. 7, 2018, by the Japanese Patent Office as the International Searching Authority for International Application No. PCT/JP2018/019364.

Knels, et al., "Blue light stress in retinal neuronal (R28) cells is dependent on wavelength range and irradiance", The European Journal of Euroscience, 2011, vol. 34, iss.4, pp. 548-558.

* cited by examiner

*Primary Examiner* — Robert T Butcher
(74) *Attorney, Agent, or Firm* — Buchanan Ingersoll & Rooney PC

(57) ABSTRACT

The lens of the present invention includes an indole-based compound represented by General Formula (1), and a polycarbonate resin having a weight average molecular weight of 40,000 to 60,000, wherein the content of the indole-based compound is 0.01 to 0.8 parts by mass with respect to 100 parts by mass of the polycarbonate resin, (1)

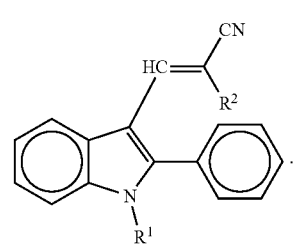

15 Claims, No Drawings

POLYCARBONATE RESIN LENS AND POLYCARBONATE RESIN COMPOSITION

TECHNICAL FIELD

The present invention relates to a polycarbonate resin lens including an ultraviolet absorber and a polycarbonate resin composition.

BACKGROUND ART

In the related art, the adverse effects of exposure of the eyes to ultraviolet light have been regarded as a problem. Furthermore, in recent years, there is a problem in that blue light included in natural light, light emitted from liquid crystal displays of office equipment and displays of portable equipment such as smartphones and mobile phones, and the like affects the eyes, causing eye fatigue, pain, and the like. Therefore, it is desirable to reduce the amount of exposure of the eyes to light from ultraviolet light to blue light having a relatively short wavelength of approximately 420 nm.

Furthermore, the possibility that ultraviolet light causes keratitis and cataracts has been suggested and there is a demand for the development of a lens having an ultraviolet absorbing ability in order to protect the eyes from ultraviolet light. The influence of short wavelength blue light having a wavelength of approximately 420 nm on the eyes is described in Non-Patent Document 1.

In Non-Patent Document 1, retina neurocyte (cultured retinal neuronal (R28) cells of rats) were irradiated with blue LED light having different peak wavelengths of 411 nm and 470 nm and damage to the retinal nerve cells due to the blue LED light was verified. As a result, it was shown that, in a case of being irradiated (4.5 w/m$^2$) with blue light having a peak wavelength at 411 nm, cell death of the retinal nerve cells occurred within 24 hours, while blue light having a peak wavelength at 470 nm did not cause changes in the cells even with the same amount of irradiation. In other words, it was shown that suppressing exposure to light with a wavelength of 400 to 420 nm is important to prevent eye damage.

In addition, there is a concern that exposure of the eyes to blue light for a long time causes eye fatigue and stress and may be considered a factor which causes age-related macular degeneration.

In addition, since polycarbonate resins have a high refractive index and have excellent properties of transparency and impact resistance, such resins have recently attracted attention as lens materials, particularly, as the materials of spectacle lenses. Since spectacle lenses formed of polycarbonate resin have a high impact strength in comparison with glass lenses or plastic lenses formed by cast polymerization (may be referred to below as cast lenses) in the related art, it is possible to lighten the lenses by thinning, the safety is excellent, and the functionality is high. Therefore, spectacle lenses formed of polycarbonate resin have come to be used for vision correction lenses, sunglasses, protective glasses, and the like.

Furthermore, since it is possible to carryout injection molding with polycarbonate resins, the productivity thereof is high in comparison with the cast lenses described above.

Recently, there has been a strong demand for imparting an ultraviolet absorbing ability to spectacle lenses and for protecting eyes from harmful ultraviolet light. For example, with a cast lens or a glass lens, a coating layer having an ultraviolet absorbing ability is imparted to the lens surface to meet these demands. However, such a coating method is expensive and the lens itself may be slightly yellowed. In addition, when polymerizing a cast lens, an ultraviolet absorber is also added. However, in such a method, the ultraviolet absorber may affect the polymerizability and the lens itself may turn yellow.

On the other hand, with a spectacle lens comprised of polycarbonate resin, the polycarbonate resin itself has the ultraviolet absorbing ability. Furthermore, since the polycarbonate resin is a thermoplastic resin, the influence of the addition of the ultraviolet absorber is small in comparison with a polymerization curable resin or the like and it is possible to blend in the ultraviolet absorber when carrying out melt molding. Therefore, it is possible to easily contain an arbitrary ultraviolet absorber having the ultraviolet absorbing ability in a region different from the polycarbonate resin, and, for example, it is possible to blend in the ultraviolet absorber on the long wavelength side. However, the polycarbonate resins of the related art are limited to absorbing ultraviolet light up to a wavelength of 375 nm and, in order to absorb light of longer wavelengths, it is necessary to add 2 to 10 times the usual content of the ultraviolet absorber. In general, ultraviolet absorbers are sublimable, thus, if a large amount of ultraviolet absorber is added, the ultraviolet absorbers sublime to contaminate a mirror-surface of mold during injection molding of polycarbonate resin, which adversely affects the appearance of the obtained lens.

Patent Document 1 discloses a method of cutting ultraviolet light having a wavelength of 400 nm or less by using a combination of an ultraviolet absorber having an absorption maximum at a wavelength of 300 to 345 nm and an ultraviolet absorber having an absorption maximum at a wavelength of 346 to 400 nm. However, the spectral transmittance of ultraviolet light having a wavelength of 400 nm is 10% or less, which is not necessarily sufficient to protect the eyes from ultraviolet light.

In addition, Patent Document 2 discloses a spectacle lens formed from a polycarbonate resin composition obtained by blending a specific amount of a benzotriazole-based ultraviolet absorber having a specific structure. However, the disclosure only relates to the spectral transmittance at a wavelength of 400 nm, and there is no description relating to the light transmittance at a wavelength of 420 nm.

Furthermore, Patent Document 3 discloses an aromatic polycarbonate resin composition for spectacle lenses formed of an aromatic polycarbonate resin, a saturated aliphatic hydrocarbon, the benzotriazole-based ultraviolet absorber, and a phosphorous acid ester type stabilizer having a specific structure. However, the disclosure only relates to the spectral transmittance at a wavelength of 400 nm, and there is no description relating to the light transmittance at a wavelength of 420 nm.

Patent Document 4 discloses an aromatic polycarbonate resin composition for spectacle lenses containing a polycarbonate resin, a saturated aliphatic hydrocarbon, a benzotriazole-based ultraviolet absorber having a vapor pressure of $1 \times 10^{-8}$ Pa or less at 25° C., and a phosphorous acid ester type stabilizer. The document discloses that in a case where an ultraviolet absorber having a high vapor pressure is used, the defect rate in the lens molded products becomes high. However, in the composition disclosed in Patent Document 4, the ultraviolet cut wavelength does not reach 384 nm and 420 nm.

Patent Document 5 discloses a light-shielding lens for eye protection glasses containing an indole-based ultraviolet absorber having a specific melting point, and a polycarbonate resin is given as an example of a synthetic resin in the detailed description thereof. However, Patent Document 5 relates to a light-shielding lens, and there is no example which is actually blended with a polycarbonate resin and no description relating to the molecular weight of the polycarbonate resin.

For safety, it is necessary to adjust the light shielding lens to have an antiglare property to the extent that it is possible to identify the color of a traffic light and it is preferable to suppress the wavelength of 420 nm or less in a total light transmittance of 75% or more. Examples of such a light shielding lens include a spectacle lens, which is commonly called CR39, comprised of resin composition in which a diethylene glycol bisallyl carbonate resin is the main component and a cobalt organic acid is blended therewith, and a medical lens having both an antiglare effect and a polarization characteristic is known, in which casting polymerization is carried out so as to embed a polarizing film in the resin (Patent Document 6). However, this light-shielding lens has a low impact resistance and exhibits brittle fracture.

Accordingly, there is a demand for a lens with high total light transmittance and high impact resistance, in which ultraviolet and visible light of 420 nm or less are suppressed.

RELATED DOCUMENT

Patent Document

[Patent Document 1] Japanese Patent Application Laid-open Publication NO. H09-263694
[Patent Document 2] Japanese Patent Application Laid-open Publication NO. 2004-325511
[Patent Document 3] Japanese Laid-open patent publication NO. 2004-352828
[Patent Document 4] Japanese Patent Application Laid-open Publication NO. 2004-352829
[Patent Document 5] Japanese Patent Application Laid-open Publication NO. 2012-58643
[Patent Document 6] Japanese Patent Application Laid-open Publication NO. H05-212103

Non-Patent Document

[Non-patent document 1] The European Journal of Euroscience, Vol. 34, iss. 4, 548-558 (2011)

SUMMARY OF THE INVENTION

Technical Problem

The present invention solves the problems of the related art described above and specifically has the following points as objects.

The first object of the present invention is to provide a lens comprised of polycarbonate resin which is excellent in impact resistance, mold contamination resistance, transparency, and color tone stability, and excellent in the effect of cutting ultraviolet light of a specific wavelength, thereby yellowing due to ultraviolet light is suppressed.

The second object of the present invention is to provide a lens which is excellent in the effect of cutting blue light having a wavelength of 420 nm, thereby reduces the influence of the blue light on the eyes, and which has a high total light transmittance.

The third object of the present invention is to provide a polycarbonate resin composition in which contamination of a mold surface due to sublimation of an ultraviolet absorber is suppressed during molding processing such as injection molding and with which it is possible to obtain a desired lens with a high yield, and a method of manufacturing a lens using this composition.

Solution to Problem

In order to achieve the objects described above, the present inventors carried out intensive research on ultraviolet absorbers used for polycarbonate resin and completed the present invention as a result.

That is, it is possible to illustrate the present invention as follows.

[1] A lens including an indole-based compound represented by General Formula (1), and a polycarbonate resin having a weight average molecular weight of 40,000 to 60,000, in which the content of the indole-based compound is 0.01 to 0.8 parts by mass with respect to 100 parts by mass of the polycarbonate resin,

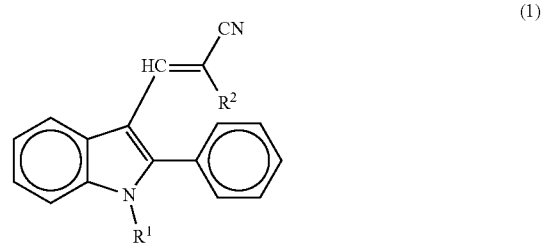

in which in the formula, $R^1$ represents an alkyl group or an aralkyl group which optionally be branched, $R^2$ represents —CN or —COORS, and $R^3$ represents an alkyl group or aralkyl group which optionally have a substituent.

[2] The lens according to [1], in which a spectral transmittance at a wavelength of 420 nm or less is 0 to 20%, at a thickness of 2 mm.
[3] The lens according to [1] or [2], in which a spectral transmittance at a wavelength of 420 nm or less is 0 to 20% and a spectral transmittance at a wavelength of 450 nm is 50% or more, at a thickness of 2 mm.
[4] The lens according to any one of [1] to [3], further including a bluing agent.
[5] The lens according to any one of [1] to [4], further including an ultraviolet absorber other than the indole-based compound represented by General Formula (1).
[6] The lens according to any one of [1] to [5], further including an antioxidant and/or a processing-heat stabilizer.
[7] A resin composition including an indole-based compound represented by General Formula (1), and a polycarbonate resin having a weight average molecular weight of 40,000 to 60,000, in which the content of the indole-based compound is 0.01 to 0.8 parts by mass with respect to 100 parts by mass of the polycarbonate resin,

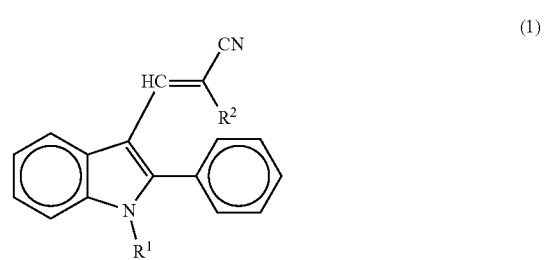

in which in the formula, $R^1$ represents an alkyl group or an aralkyl group which optionally be branched, $R^2$ represents —CN or —COORS, and $R^3$ represents an alkyl group or an aralkyl group which optionally have a substituent.

[8] A method of manufacturing a lens, including a step of molding by injection molding a resin composition including 0.01 to 0.8 parts by mass of an indole-based compound represented by General Formula (1) with respect to 100 parts by mass of a polycarbonate resin having a weight average molecular weight of 40,000 to 60,000,

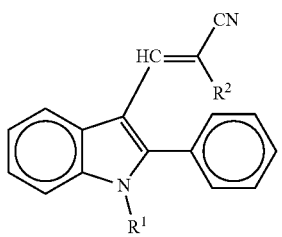

(1)

in which in the formula, $R^1$ represents an alkyl group or an aralkyl group which optionally be branched, $R^2$ represents —CN or —COORS, and $R^3$ represents an alkyl group or aralkyl group which optionally have a substituent.

Advantageous Effects of Invention

According to the present invention, it is possible to provide a lens comprised of polycarbonate resin which is excellent in impact resistance, mold contamination resistance, transparency, and color tone stability, for which yellowing due to ultraviolet light is suppressed since the effect of cutting ultraviolet light of a specific wavelength is excellent, which reduces the influence of the blue light on the eyes since the effect of cutting blue light having a wavelength of 420 nm is excellent, and which has a high total light transmittance. In addition, the surface state of the lens of the present invention does not change even after aging and the storage stability is also excellent.

Furthermore, according to the present invention, it is possible to provide a polycarbonate resin composition capable of suppressing contamination of the mold surface and obtaining a desired lens with a high yield, and method of manufacturing a lens using this composition.

DESCRIPTION OF EMBODIMENTS

A description will be given below of the present invention using embodiments.

The lens of the present embodiment includes an indole-based compound represented by General Formula (1) and a polycarbonate resin having a weight average molecular weight of 40,000 to 60,000. The content of the indole-based compound is 0.01 to 0.8 parts by mass with respect to 100 parts by mass of the polycarbonate resin.

[Polycarbonate Resin]

The polycarbonate resin is an aromatic polycarbonate resin obtained by reacting dihydric phenol and a carbonate precursor.

Specific examples of the dihydric phenol include bis (hydroxyaryl) alkanes such as 2,2-bis(4-hydroxyphenyl) propane (generally called bisphenol A), bis(4-hydroxyphenyl) methane, 1,1-bis(4-hydroxyphenyl) ethane, 2,2-bis(4-hydroxyphenyl) butane, 2,2-bis(4-hydroxyphenyl) octane, 2,2-bis(4-hydroxyphenyl) phenylethane, 2,2-bis(4-hydroxy-3-methylphenyl) propane, 1,1-bis(4-hydroxy-3-tert-butylphenyl) propane, 2,2-bis(4-hydroxy-3-bromophenyl) propane, 2,2-bis(4-hydroxy-3,5-dibromophenyl) propane, 2,2-bis(4-hydroxy-3,5-dichlorophenyl) propane, bis(hydroxyphenyl) cycloalkanes such as 1,1-bis(hydroxyphenyl) cyclopentane and 1,1-bis(hydroxyphenyl) cyclohexane, dihydroxy aryl ethers such as 4,4'-dihydroxydiphenylether and 4,4'-dihydroxy-3,3'-dimethyldiphenylether, dihydroxydiaryl sulfides such as 4,4'-dihydroxydiphenyl sulfide and 4,4'-dihydroxy-3,3'-dimethyldiphenyl sulfide, dihydroxydiaryl sulfoxides such as 4,4'-dihydroxydiphenyl sulfoxide and 4,4'-dihydroxy-3,3'-dimethyldiphenylsulfoxide, dihydroxydiarylsulfones such as 4,4'-dihydroxydiphenylsulfone and 4,4'-dihydroxy-3,3'-dimethyldiphenylsulfone, and the like. These dihydric phenols may be used alone or used in a combination of two types or more.

Among the above dihydric phenols, it is preferable to use 2,2-bis(4-hydroxyphenyl) propane (bisphenol A) as a main dihydric phenol component, and, in particular, a dihydric phenol in which 70 mol % or more of all the dihydric phenol components is bisphenol A is preferable, and 80 mol % or more is particularly preferable. Aromatic polycarbonate resins in which the dihydric phenol component is substantially bisphenol A are most preferable.

In the present embodiment, from the viewpoint of the effect of the present invention, the polycarbonate resin is preferably a bisphenol A polycarbonate.

A brief description will be given of the basic means for producing a polycarbonate resin.

In a solution method using phosgene as a carbonate precursor, the reaction between the dihydric phenol component and phosgene is usually carried out in the presence of an acid binder and an organic solvent. As the acid binder, for example, hydroxides of alkali metals such as sodium hydroxide and potassium hydroxide or amine compounds such as pyridine are used. As the organic solvent, for example, halogenated hydrocarbons such as methylene chloride and chlorobenzene are used. In addition, it is possible to use a catalyst such as tertiary amine or quaternary ammonium salt to accelerate the reaction, and, as a molecular weight modifier, it is desirable to use, for example, an end terminator such as phenol or an alkyl-substituted phenol such as p-tert-butylphenol. Usually, the reaction temperature is 0 to 40° C., the reaction time is a few minutes to 5 hours, and the pH during the reaction is maintained at 10 or more, which is preferable.

The transesterification method (melting method) using a carbonic diester as a carbonate precursor is a method in which stirring is carried out while heating a predetermined proportion of a dihydric phenol component and a carbonic diester in the presence of an inert gas to distill off the produced alcohols or phenols. The reaction temperature is different depending on the boiling point and the like of the alcohol or phenol to be produced, but is usually in the range of 120 to 300° C. The reaction is carried out from the initial stage under reduced pressure while distilling off the produced alcohols or phenols. In addition, it is possible to use the usual transesterification catalysts to accelerate the reaction. Examples of carbonic diesters used for this transesterification reaction include diphenyl carbonate, dinaphthyl carbonate, dimethyl carbonate, diethyl carbonate, dibutyl carbonate, and the like, and diphenyl carbonate is particularly preferable.

The molecular weight of the polycarbonate resin is preferably 40,000 to 60,000 as a weight average molecular weight measured by gel permeation chromatography in terms of standard polystyrene, more preferably 40,000 to 50,000, and particularly preferably 40,000 to 45,000.

The spectacle lens is precision molded and it is important to accurately transfer the mirror surface of the mold thereto to impart a specified curvature and frequency, thus, a low viscosity resin with good melt flowability is desirable. However, if the viscosity is excessively low, it is not possible to maintain the impact strength which is a characteristic of polycarbonate resin. On the other hand, when the viscosity is high, the handling property is decreased and the productivity of the lens is decreased. Accordingly, when the weight average molecular weight of the polycarbonate resin is in the range described above, the mold transferability is excellent, the impact resistance is also excellent, and the productivity of the lens is also excellent.

[Indole-Based Compounds]

The indole-based compound used in the present embodiment is an ultraviolet absorber represented by General Formula (1).

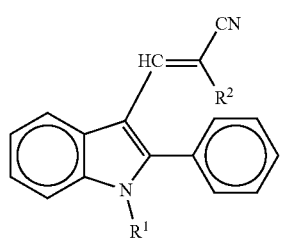

(1)

In General Formula (1), $R^1$ represents an alkyl group or an aralkyl group which optionally be branched, $R^2$ represents —CN or —COORS, and $R^3$ represents an alkyl group or aralkyl group which optionally have a substituent.

In General Formula (1), examples of $R^1$ include an alkyl group or an aralkyl group having 1 to 12 carbon atoms which optionally have a branched chain. Specific examples thereof include a methyl group, an ethyl group, an (iso) butyl group, a t-butyl group, a hexyl group, an octyl group, a 2-ethylhexyl group, a dodecyl group, a benzyl group, and the like.

$R^2$ is a nitrile (—CN) group or an ester (—COOR$^3$) group.

Examples of $R^3$ include an alkyl group or an aralkyl group having 1 to 20 carbon atoms which optionally have a substituent. Specific examples of $R^3$ include the examples given for the above $R^1$ and a β-cyanoethyl group, a β-chloroethyl group, an ethoxypropyl group, a hydroxyalkyl group, and an alkoxyalkoxyalkyl group.

In the present embodiment, the indole-based compound represented by General Formula (1) is not sublimable, and contamination of the mirror mold is suppressed at the time of injection molding the polycarbonate resin, and contamination of the mirror mold is suppressed even in a case where a large amount of the compound is added. Furthermore, the surface state of the lens including the indole-based compound does not change even after aging and the storage stability is also excellent.

An indole-based compound (1) is obtained by subjecting a compound represented by General Formula (2) to a condensation reaction with a compound represented by General Formula (3).

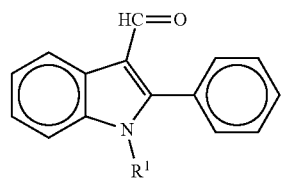

(2)

In General Formula (2), $R^1$ is the same as $R^1$ of General Formula (1).

(3)

In General Formula (3), $R^2$ is the same as $R^2$ of General Formula (1).

Examples of compound (3) described above include malononitrile (NC—CH$_2$—CN) and α-cyanoacetic acid ester (NC—CH$_2$—COOR$^3$; $R^3$ is the same as $R^3$ of Formula (1)). Specific examples of α-cyanoacetic acid ester include cyanoacetic acid methyl ester, cyanoacetic acid ethyl ester (ethyl cyanoacetate), cyanoacetic acid isopropyl ester, cyanoacetic acid butyl ester, cyanoacetic acid tertiary butyl ester, cyanoacetic acid amyl ester, cyanoacetic acid octyl esters, esters of cyanoacetic acid and higher alcohols (for example, undecyl alcohol, dodecyl alcohol, and C13 to C20 aliphatic alcohol), cyanoacetic acid benzyl ester, and the like.

In the above condensation reaction, used amount of compound (3) is preferably 0.9 to 1.2 equivalents with respect to compound (2). It is possible to carry out the condensation reaction in a solvent at 10° C. to the boiling point of the solvent for 0.5 hours to 20 hours. As the solvent, it is possible to use alcohols (for example, methanol, ethanol, and the like), acetic anhydride, and the like. When an alcohol is used as a solvent, it is possible to use bases (for example, pyridine, triethylamine, and the like) as a catalyst.

After completion of the reaction, separation and, as necessary, purification is carried out to obtain the compound (1). The separation and purification method is not particularly limited, for example, the reaction product mixture is discharged into water or the like, the compound (1) is precipitated as a precipitate, and then the precipitate is separated. Generally, it is possible to perform purification by washing with an alcohol solvent or the like; however, the purification may be performed by recrystallization or the like as necessary.

It is possible to easily synthesize the raw material compound (2) by a known method. For example, it is possible to easily carry out synthesis by adding phosphorus oxychloride to a dimethylformamide solution of a compound represented by General Formula (4) and performing formylation (Vilsmeier reaction).

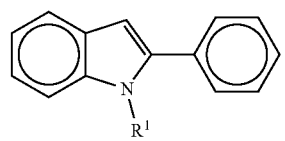

(4)

In General Formula (4), $R^1$ is the same as $R^1$ of General Formula (1).

As another synthesis method of another compound (1), for example, it is also possible to obtain the compound (1) by subjecting a compound represented by Formula (5) and the compound (3) to a condensation reaction to obtain the compound represented by General Formula (6), then carrying out a reaction with an alkylating agent or an aralkylating agent to carry out N-alkylation or aralkylation. In addition, when $R^3$ is hydrogen, carrying out a treatment with an alkylating agent makes it possible to obtain a derivative.

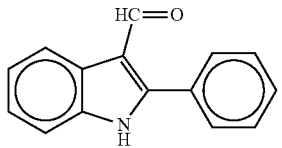

(5)

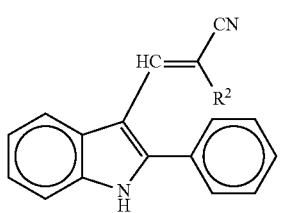

(6)

In General Formula (6), $R^2$ is the same as $R^2$ of General Formula (1).

It is possible to carry out the condensation reaction of the compound (5) and the compound (3) under the same conditions as in the case of the condensation reaction described above. In addition, N-alkylation or aralkylation may be carried out with a typical method. Examples of the alkylating agent or the aralkylating agent include halogenated alkyl or halogenated aralkyl (for example, methyl iodide and benzyl iodide), dialkyl sulfate or diaralkyl sulfate (for example, dimethyl sulfate and dibenzyl sulfate), aromatic sulfonate ester, and the like.

The indole-based compound (1) synthesized as described above generally has a maximum absorption at 380 to 400 nm. Accordingly, it is possible to effectively shield the ultraviolet light with a wavelength in this range.

The blending amount of the indole-based compound (1) is preferably 0.01 to 0.8 parts by mass with respect to 100 parts by mass of the polycarbonate resin, more preferably 0.01 to 0.3 parts by mass, even more preferably 0.02 to 0.3 parts by mass, and particularly preferably 0.02 to 0.1 parts by mass.

In a case where the blending amount is 0.01 parts by mass or more, the ability to shield ultraviolet and visible light at 420 nm or less is clearly exhibited, which is preferable, and in a case where the blending amount is 0.8 parts by mass or less, the yellowness of the polycarbonate resin (YI value) is decreased, which is preferable. In addition, in a case where the blending amount is 0.8 parts by mass or less, it is possible to maintain a favorable impact strength and mold contamination is further suppressed, which is preferable.

That is, including the indole-based compound (1) in the amount described above makes it possible to effectively shield ultraviolet and visible light of 420 nm or less, and the color and impact resistance is excellent, and the mold contamination resistance is particularly excellent.

It is possible to obtain the polycarbonate resin composition of the present embodiment by mixing a polycarbonate resin and an indole-based compound represented by General Formula (1). The mixing method is not particularly limited; however, it is possible to carry out the mixing by melt-kneading with a melt extruder (short screw or twin screw).

In addition, it is also possible to mix the indole-based compound represented by General Formula (1) with polycarbonate resin in a high concentration as necessary and then carry out mixing by a method of mixing the above with polycarbonate resin as a masterbatch.

In the polycarbonate resin composition according to the present embodiment, it is desirable for the content of foreign material to be extremely small and filtration of the polycarbonate resin composition is preferably carried out by a polymer filter. The mesh of the polymer filter is preferably 100 μm or less, and more preferably 30 μm or less. In addition, the step of collecting the resin pellets is, naturally, preferably performed in a low dust environment, and more preferably with a cleanness of class 1000 or less.

It is possible to obtain the lens according to the present embodiment by molding the polycarbonate resin composition according to the present embodiment.

The method of manufacturing a lens of the present embodiment includes a step of molding the resin composition of the present embodiment by injection molding. It is possible to perform this step by an injection molding method such as an injection molding method or an injection compression molding method. It is possible to perform the injection molding step under conditions known in the art.

The polycarbonate resin composition according to the present embodiment is excellent in moldability and is able to suppress contamination of the mold surface, thus, it is possible to obtain a desired lens with a high yield by a manufacturing method including the injection molding step and also to obtain a lens excellent in heat resistance and impact resistance.

In addition, it is possible to use various types of additives in the polycarbonate resin composition according to the present embodiment in order to impart various characteristics in a range which does not impair the objective of the present invention. Examples of additives include antioxidants, processing-heat stabilizers, mold release agents, ultraviolet absorbers, bluing agents, polymeric metal deactivators, flame retardants, lubricants, antistatic agents, heat ray shielding agents, fluorescent dyes (including fluorescent whitening agents), pigments, light scattering agents, reinforcing fillers, surfactants, antibacterial agents, plasticizers, compatibilizers, and the like.

Examples of antioxidants include triethylene glycol-bis [3-(3-tert-butyl-5-methyl-4-hydroxyphenyl)propionate], 1,6-hexanediol-bis[3-(3,5)-di-tert-butyl-4-hydroxyphenyl) propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylene bis(3,5-di-tert-butyl-4-hydroxy-hydrocinnamide), 3,5-di-tert-butyl-4-hydroxy-benzyl phosphonate-diethyl ester, tris(3,5-di-tert-butyl-4-hydroxybenzyl) isocyanurate, and 3,9-bis{1,1-dimethyl-2-[β-(3-tert-butyl-4)-hydroxy-5-methylphenyl)propionyloxy]ethyl}-2,4, 8,10-tetraoxaspiro[5.5]undecane, and the like.

The content of the antioxidant in the polycarbonate resin composition is preferably 0.001 to 0.3 parts by mass with respect to 100 parts by mass of the polycarbonate resin.

Examples of processing-heat stabilizers include phosphorus-based processing-heat stabilizers, sulfur-based processing-heat stabilizers, and the like.

Examples of phosphorus-based processing-heat stabilizers include phosphorous acid, phosphoric acid, phosphorous acid, phosphoric acid, esters thereof, and the like. Specific examples thereof include triphenyl phosphite, tris(nonylphenyl) phosphite, tris(2,4-di-tert-butylphenyl) phosphite, tris (2,6-di-tert-butylphenyl) phosphite, tri n-decyl phosphite, tri n-octyl phosphite, tri n-octadecyl phosphite, di n-decyl monophenyl phosphite, di n-octyl monophenyl phosphite, diisopropyl monophenyl phosphite, mono n-butyl diphenyl phosphite, monodecyl diphenyl phosphite, mono n-octyl diphenyl phosphite, bis(2,6-di-tert-butyl-4-methylphenyl) pentaerythritol diphosphite, 2,2-methylene bis(4,6-di-tert-butylphenyl) octyl phosphite, bis(n-nonylphenyl) pentaerythritol diphosphite, bis(2,4-dicumylphenyl) pentaerythritol diphosphite, bis(2,4-di-tert-butylphenyl) pentaerythritol diphosphite, distearyl pentaerythritol diphosphite, tri n-butyl phosphate, triethyl phosphate, trimethyl phosphate, triphenyl phosphate, diphenyl monoorthoxenyl phosphate, di n-butyl phosphate, di n-octyl phosphate, diisopropyl phosphate, dimethyl benzenephosphonate, diethyl benzenephosphonate, dipropyl benzenephosphonate, tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, bis(2,4-di-tert-butylphenyl)-4-phenyl-phenylphosphonite and bis(2,4-di-tert-butylphenyl)-3-phenyl-phenylphosphonite, and the like. The content of the phosphorus-based processing-heat stabilizer in the polycarbonate resin composition is preferably 0.001 to 0.2 parts by mass with respect to 100 parts by mass of the polycarbonate resin.

Examples of sulfur-based processing-heat stabilizers include pentaerythritol-tetrakis(3-lauryl thiopropionate), pentaerythritol-tetrakis(3-myristyl thiopropionate), pentaerythritol-tetrakis(3-stearyl thiopropionate), dilauryl-3,3'-thiodipropionate, dimyristyl-3,3'-thiodipropionate, distearyl-3,3'-thiodipropionate, and the like.

The content of the sulfur-based processing-heat stabilizer in the polycarbonate resin composition is preferably 0.001 to 0.2 parts by mass with respect to 100 parts by mass of the polycarbonate resin.

As a mold release agent, a mold release agent in which 90 mass % or more is formed of esters of alcohols and fatty acids is preferable. Specific examples of the esters of alcohols and fatty acids include esters of monohydric alcohol and fatty acid and partial esters or whole esters of polyhydric alcohol and fatty acid. As the ester of a monohydric alcohol and a fatty acid, an ester of a monohydric alcohol having 1 to 20 carbon atoms and a saturated fatty acid having 10 to 30 carbon atoms is preferable. In addition, as the partial ester or whole ester of a polyhydric alcohol and a fatty acid, a partial ester or whole ester of polyhydric alcohol having 1 to 25 carbon atoms and saturated fatty acid having 10 to 30 carbon atoms is preferable.

Examples of esters of a monohydric alcohol and a saturated fatty acid include stearyl stearate, palmityl palmitate, n-butyl stearate, methyl laurate, isopropyl palmitate, and the like. Examples of partial esters or whole esters of polyhydric alcohols and saturated fatty acids include whole esters or partial esters of dipentaerythritol such as stearic acid monoglyceride, stearic acid monoglyceride, stearic acid diglyceride, stearic acid triglyceride, stearic acid monosorbitate, behenic acid monoglyceride, capric acid monoglyceride, lauric acid monoglyceride, pentaerythritol monostearate, pentaerythritol tetrastearate, pentaerythritol tetrapelargonate, propylene glycol monostearate, biphenyl biphenate, sorbitan monostearate, 2-ethylhexyl stearate, and dipentaerythritol hexastearate.

The content of these mold release agents is preferably in a range of 0.005 to 2.0 parts by mass with respect to 100 parts by mass of the polycarbonate resin, more preferably in a range of 0.01 to 0.6 parts by mass, and even more preferably in a range of 0.02 to 0.5 parts by mass.

Other than the indole-based compound represented by General Formula (1), as the ultraviolet absorber, it is possible to include at least one type of ultraviolet absorber selected from a group consisting of a benzotriazole-based ultraviolet absorber, a benzophenone-based ultraviolet absorber, a triazine-based ultraviolet absorber, a cyclic imino ester-based ultraviolet absorber, and a cyanoacrylate-based ultraviolet absorber. The ultraviolet absorbers listed below may be used alone or in a combination of two or more types.

Examples of benzotriazole-based ultraviolet absorbers include 2-(2-hydroxy-5-methylphenyl) benzotriazole, 2-(2-hydroxy-5-tert-octylphenyl) benzotriazole, 2-(2-hydroxy-3,5-dicumylphenyl) phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl) phenol], 2-(2-hydroxy-3,5-di-tert-butylphenyl) benzotriazole, 2-(2-hydroxy-3,5-di-tert-butylphenyl)-5-chlorobenzotriazole, 2-(2-hydroxy-3,5-di-tert-amylphenyl) benzotriazole, 2-(2-hydroxy-5-tert-octylphenyl) benzotriazole, 2-(2-hydroxy-5-tert-butylphenyl) benzotriazole, 2-(2-hydroxy-4-n-octyloxyphenyl) benzotriazole, 2,2'-methylenebis(4-cumyl-6-benzotriazolephenyl), 2,2'-p-phenylenebis(1,3-benzoxazin-4-one), 2-[2-hydroxy-3-(3,4,5,6-tetrahydrophthalimidomethyl)-5-methylphenyl] benzotriazole, and the like.

Examples of benzophenone-based ultraviolet absorbers include 2,4-dihydroxybenzophenone, 2-hydroxy-4-methoxybenzophenone, 2-hydroxy-4-n-octyloxybenzophenone, 2-hydroxy-4-benzyloxybenzophenone, 2-hydroxy-4-methoxy-5-sulfoxybenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl) methane, 2-hydroxy-4-n-dodecyloxybenzophenone, 2-hydroxy-4-methoxy-2'-carboxybenzophenone, and the like.

Examples of triazine ultraviolet absorbers include 2-(4,6-diphenyl-1,3,5-triazin-2-yl)-5-[(n-hexyl)oxy]-phenol, 2-(4, 6-bis(2,4-dimethylphenyl)-1,3,5-triazin-2-yl)-5-[(n-octyl) oxy]-phenol, and the like.

Examples of cyclic imino ester-based ultraviolet absorbers include 2,2'-bis(3,1-benzoxazin-4-one), 2,2'-p-phenylenebis(3,1-benzoxazine-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazine-4)-one), 2,2'-(2-methyl-p-phenylene)bis(3,1-benzoxazin-4-one), 2,2'-(2-nitro-p-phenylene)bis(3, 1-benzoxazin-4-one) and 2,2'-(2-chloro-p-phenylene)bis(3, 1-benzoxazin-4-one), and the like.

Examples of cyanoacrylate-based ultraviolet absorbers include 1,3-bis-[(2'-cyano-3',3'-diphenylacryloyl)oxy]-2,2-bis[(2-cyano-3,3-diphenylacryloyl)oxy]methyl)propane, and 1,3-bis-[(2-cyano-3,3-diphenylacryloyl)oxy]benzene, and the like.

The content of the ultraviolet absorber other than the indole-based compound (1) is preferably 0.01 to 1.0 part by mass with respect to 100 parts by mass of the polycarbonate resin, and more preferably 0.02 to 0.8 parts by mass, and even more preferably 0.05 to 0.8 parts by mass. With this blending amount range, it is possible to impart sufficient weather resistance to a polycarbonate resin composition according to the application thereof.

Examples of bluing agents include Macrolex Violet B and Macrolex Blue RR made by Bayer, and Polysynthren Blue RLS made by Clariant, and K.P. Plast Violet 2R made by KIWA Chemical Industry Co., Ltd., and the like.

The bluing agent is effective to eliminate the yellowness of the polycarbonate resin composition. In particular, in a case of a polycarbonate resin composition to which weather resistance is imparted, a certain amount of ultraviolet absorber is blended, thus, the polycarbonate resin molded article tends to be slightly yellow due to the "action and color of the ultraviolet absorber" and blending a bluing agent therein is particularly effective for imparting a natural transparency to a sheet or lens.

The blending amount of the bluing agent is, for example, preferably 0.05 to 20 ppm with respect to the polycarbonate resin, and more preferably 0.1 to 15 ppm.

It is possible to obtain an ultraviolet and visible light absorbing spectacle lens using the lens of the present embodiment. As necessary, a coating layer may be applied to one surface or both surfaces thereof.

Specific examples of the coating layer include a primer layer, a hard coat layer, an antireflective layer, an antifogging coating layer, an anti-contamination layer, a water repellent layer, and the like. It is also possible to use each of these coating layers alone or as multiple layers of a plurality of coating layers. In a case where coating layers are applied to both surfaces, the same coating layer may be applied to each surface or different coating layers may be applied.

Each of these coating layers may be combined with a known ultraviolet absorber other than an indole-based compound represented by General Formula (1), an infrared absorber for the purpose of protecting the eyes from infrared rays, and a light stabilizer or antioxidant for the purpose of improving the weather resistance of the lens, dyes and pigments for the purpose of enhancing the fashionability of the lens, and photochromic dyes, photochromic pigments, antistatic agents, and other known additives for enhancing the performance of the lens. With respect to the layer to be coated by application, various leveling agents may be used for the purpose of improving the coatability.

The primer layer is usually formed between the hard coat layer described below and the lens. The primer layer is a coating layer for the purpose of improving the adhesion between the hard coat layer formed thereon and the lens and it is also possible to improve the impact resistance in some cases. It is possible to use any material for the primer layer as long as the adhesion to the obtained lens is high, but, normally, a primer composition having a main component of a urethane resin, an epoxy resin, a polyester resin, a melamine resin, or polyvinyl acetal, or the like is used. The primer composition may be used with a suitable solvent which does not affect the lens for the purpose of adjusting the viscosity of the composition. Naturally, the primer composition may be used without a solvent.

It is possible to form the primer layer using any of a coating method and a dry method. In a case where a coating method is used, the primer composition is coated on the lens by a known coating method such as spin coating or dip coating, and then solidified to form a primer layer. In a case of using a dry method, the primer layer is formed by a known dry method such as a CVD method or a vacuum evaporation method. When forming the primer layer, the surface of the lens may be subjected to a pretreatment such as an alkali treatment, a plasma treatment, and an ultraviolet treatment, as necessary, for the purpose of improving adhesion.

The hard coat layer is a coating layer for the purpose of imparting functions such as scratch resistance, abrasion resistance, moisture resistance, warm water resistance, heat resistance, and weather resistance to the lens surface.

As the hard coat layer, generally, a hard coat composition is used including one type or more of oxide fine particles formed of a curable organic silicon compound, and an element selected from the group of elements of Si, Al, Sn, Sb, Ta, Ce, La, Fe, Zn, W, Zr, In, and Ti and/or a composite oxide of two or more types of elements selected from these element groups.

Other than the above components, the hard coat composition preferably includes at least any one of amines, amino acids, metal acetylacetonate complexes, organic acid metal salts, perchloric acids, salts of perchloric acids, acids, metal chlorides, and polyfunctional epoxy compounds. The hard coat composition may be used with a suitable solvent which does not affect the lens or may be used without a solvent.

The hard coat layer is usually formed by coating a hard coat composition by a known coating method such as spin coating or dip coating and then carrying out curing. Examples of a curing method include a curing method using thermal curing, irradiation of energy beams such as ultraviolet light and visible light, and the like. In order to suppress the generation of interference fringes, the refractive index of the hard coat layer is preferably such that the difference in refractive index with the lens is in the range of ±0.1.

An antireflective layer is usually formed on the hard coat layer as necessary. There are inorganic and organic antireflective layers, and in the case of inorganic layers, inorganic oxides such as $SiO_2$ and $TiO_2$ are used, and the antireflective layer is formed by a dry method such as a vacuum evaporation method, a sputtering method, an ion plating method, an ion beam assistance method, or a CVD method. In the case of organic layers, the antireflective layer is formed by a wet method using a composition including an organosilicon compound and silica-based fine particles having an internal cavity.

Antireflection layers may be single layer or multilayer and, in a case of using a single layer, the refractive index thereof is preferably lower by at least 0.1 or more than the refractive index of the hard coat layer. In order to effectively exhibit the antireflective function, it is preferable to use a multilayer antireflective film, in which case, low refractive index films and high refractive index films are alternately laminated. Also, in such a case, the refractive index difference between the low refractive index films and the high refractive index films is preferably 0.1 or more. Examples of the high refractive index film include films of $ZnO$, $TiO_2$, $CeO_2$, $Sb_2O_5$, $SnO_2$, $ZrO_2$, $Ta_2O_5$, or the like, and examples of the low refractive index film include a $SiO_2$ film or the like.

An antifogging layer, an anti-contamination layer, and a water repellent layer may be formed on the antireflective layer, as necessary. As a method of forming an antifogging layer, an anti-contamination layer, and a water repellent layer, the treatment method, treatment material, and the like are not particularly limited, as long as the antireflective function is not adversely affected, and it is possible to use known antifogging treatment methods, contamination control treatment methods, water repellent treatment methods, and materials. Examples of antifogging treatment methods and anti-contamination treatment method include a method in which a surface is covered with a surfactant, a method in which a hydrophilic film is added to a surface to impart water absorption, a method in which the surface is covered with fine unevenness to increase water absorption, a method of using photocatalytic activity to impart water absorption, a method of carrying out a super water repellent treatment to prevent the adhesion of water droplets, and the like. In addition, examples of the water repellent treatment method include a method of forming a water repellent layer by carrying out vapor deposition or sputtering with a fluorine-containing silane compound or the like, a method of forming a water repellent treated layer by coating after dissolving a fluorine-containing silane compound in a solvent, and the like.

At a thickness of 2 mm, the lens of the present embodiment preferably has a spectral transmittance for ultraviolet and visible light of 420 nm or less of 0 to 20%, more preferably 0 to 15%, and even more preferably 0 to 10%. When the spectral transmittance of ultraviolet and visible light is 20% or less, it is effective for preventing eye damage, which is preferable.

In addition, in the lens of the present embodiment, the spectral transmittance of 450 nm, 550 nm, and 650 nm at a thickness of 2 mm is preferably 50% or more, more preferably 60% or more, and even more preferably 70% or more.

From the viewpoint of imparting functionality as a lens, it is not necessary for the spectral transmittance of 450 nm, 550 nm and 650 nm described above to all be 50% or more, and, according to the desired function, only the spectral transmittance of 450 nm may be 50% or more, only the spectral transmittance of 550 nm may be 50% or more, or only the spectral transmittance of 650 nm may be 50% or more, or the spectral transmittance of two or more wavelengths selected from the above may be 50% or more. The spectral transmittance at one or more wavelengths is preferably 50% or more, the spectral transmittance at two or more wavelengths is more preferably 50% or more, and the spectral transmittance at wavelengths of three wavelengths is even more preferably 50% or more.

In addition, the lens of the present embodiment preferably has a total light transmittance of 75% or more, more preferably has a total light transmittance of 80% or more, and even more preferably has a total light transmittance of 85% or more.

Although a description was given above of embodiments of the present invention, these are illustrations of the present invention and it is possible to adopt various configurations other than the above in a range which does not impair the effect of the present invention.

It is also possible to manufacture a film or sheet by a melt extrusion molding method using the polycarbonate resin composition of the present embodiment. In the melt extrusion molding method, the manufacturing is performed by extruding a molten resin using an extruder from a die into a film or sheet, and then adhering the result to a cooling roll and carrying out cooling and solidification. It is possible to perform the melt extrusion molding method under conditions known in the related art.

EXAMPLES

A more detailed description will be given of the present invention using Examples, but the present invention is not limited thereto. In addition, the materials and the evaluation methods used in the present Examples are as follows.

[1] Polycarbonate resin 1: Panlite L-1225, bisphenol A type polycarbonate having a weight average molecular weight of 43,000, manufactured by Teijin Ltd.

[2] Polycarbonate resin 2: SD-2173M, bisphenol A type polycarbonate having a weight average molecular weight of 45,000, manufactured by Sumika Polycarbonate Limited

[3] Polycarbonate resin 3: Bisphenol A type polycarbonate having a weight average molecular weight of 35,000

[4] Ultraviolet Absorber-A (may be abbreviated below as UVA-A): Ethyl-2-cyano-3-(1N-methyl-2-phenyl-1H-indol-3-yl) acrylate

[5] Ultraviolet Absorber-B (may be abbreviated below as UVA-B): 2-[(1N-butyl-2-phenyl-1H-indol-3-yl)methylene] malononitrile

[6] Ultraviolet Absorber-C (may be abbreviated below as UVA-C): Ethyl-2-cyano-3-(1N-benzyl-2-phenyl-1H-indol-3-yl) acrylate

[7] Ultraviolet Absorber-D (may be abbreviated below as UVA-D): Benzyl-2-cyano-3-(1N-methyl-2-phenyl-1H-indol-3-yl) acrylate

[8] Ultraviolet Absorber-E (may be abbreviated below as UVA-E): 2-(3-tert-butyl-5-methyl-2-hydroxyphenyl)-5-chlorobenzotriazole

[9] Ultraviolet Absorber-F (may be abbreviated below as UVA-F): 2,2'-methylenebis[4-(1,1,3,3-tetramethylbutyl)-6-(2H-benzotriazol-2-yl) phenol]

[10] Processing-heat stabilizer A: Tetrakis(2,4-di-t-butylphenyl)-4,4'-biphenylene diphosphonite: [Hostanox P-EPQ]

[11] Bluing agent A: 1-hydroxy-4-(p-tolylamino) anthracene-9,10-dione (Macrorex Violet B)

[Measurement of Spectral Transmittance]

Using a spectrophotometer Multispec manufactured by Shimadzu Corporation as a measuring device, the ultraviolet and visible light spectrum of a 2 mm thick plano lens was measured. [Y.I. Value Measurement]

Using a color difference meter Cute-i manufactured by Suga Test Instruments Co., Ltd., Y.I. value of a 2 mm thick plano lens was measured.

[Total Light Transmittance and Haze]

According to JISK7136 using an NDH2000 manufactured by Nippon Denshoku Industries Co., Ltd., total light transmittance and Haze of a 2 mm thick plano lens were measured.

[Molecular Weight Measurement]

Using a GPC system manufactured by Waters [pump: 1515, differential refractometer: 2414, column: Shodex K-806L], the weight average molecular weight of the polycarbonate resin was measured as a value in terms of standard polystyrene using a chloroform eluate.

[Impact Resistance Test of Molded Lens Products]

A puncture impact test was performed using a 2 mm thick plano lens in accordance with JIS K 7211-2, and a sample with a ductile fracture was evaluated as good, and a sample with a brittle fracture was evaluated as poor.

Example 1

100 parts by mass of polycarbonate resin 1 and 0.035 parts by mass of UVA-A were supplied by a quantitative feeder to a vented twin-screw extruder (TEX30α manufactured by Japan Steel Works Ltd., cylinder setting temperature: 260° C.) and foreign material was filtered through a filter, then, the result was discharged from a die in the form of strands, water-cooled and solidified, and then pelletized by a rotary cutter to obtain a polycarbonate resin composition. Thereafter, the polycarbonate resin composition was dried at 120° C. for 5 hours in a clean oven.

The polycarbonate resin composition was injection molded using an injection molding machine (SE-180DU manufactured by Sumitomo Heavy Industries, Ltd.) at a resin temperature of 280° C. and a mold temperature of 90° C. to mold a lens having a diameter of 75 mm and a thickness of 2 mm. No adhesion of contaminants or the like was observed on the mold of the injection molding machine. The spectral transmittance, total light transmittance, Haze, and YI values of the obtained lenses at 400 nm and 420 nm were measured and summarized in Table 1. Even after this lens was stored for 3 months at room temperature, no precipitation of a substance or the like was observed on the surface and no change in the surface state was observed.

Example 2

A polycarbonate resin composition was manufactured according to the procedure described in Example 1, except that, 0.021 parts by mass of UVA-A was used instead of using the 0.035 parts by mass of UVA-A in Example 1, and then the polycarbonate resin, which was dried in a clean oven, was injection molded to obtain a lens. No adhesion of contaminants or the like was observed on the mold of the injection molding machine. The optical characteristics of the obtained lens were measured and summarized in Table 1. Even after this lens was stored for 3 months at room temperature, no precipitation of a substance or the like was observed on the surface and no change in the surface state was observed.

Example 3

A polycarbonate resin composition was manufactured according to the procedure described in Example 1, except that, 0.021 parts by mass of UVA-B was used instead of using the 0.035 parts by mass of UVA-A in Example 1, and then the polycarbonate resin, which was dried in a clean oven, was injection molded to obtain a lens. No adhesion of contaminants or the like was observed on the mold of the injection molding machine. The optical characteristics of the obtained lens were measured and summarized in Table 1. Even after this lens was stored for 3 months at room temperature, no precipitation of a substance or the like was observed on the surface and no change in the surface state was observed.

Example 4

A polycarbonate resin composition was manufactured according to the procedure described in Example 1, except that, 0.020 parts by mass of UVA-C was used instead of using the 0.035 parts by mass of UVA-A in Example 1, and then the polycarbonate resin, which was dried in a clean oven, was injection molded to obtain a lens. No adhesion of contaminants or the like was observed on the mold of the injection molding machine. The optical characteristics of the obtained lens were measured and summarized in Table 1. Even after this lens was stored for 3 months at room temperature, no precipitation of a substance or the like was observed on the surface and no change in the surface state was observed.

Example 5

A polycarbonate resin composition was manufactured according to the procedure described in Example 1, except that, 0.020 parts by mass of UVA-D was used instead of using the 0.035 parts by mass of UVA-A in Example 1, and then the polycarbonate resin, which was dried in a clean oven, was injection molded to obtain a lens. No adhesion of contaminants or the like was observed on the mold of the injection molding machine. The optical characteristics of the obtained lens were measured and summarized in Table 1. Even after this lens was stored for 3 months at room temperature, no precipitation of a substance or the like was observed on the surface and no change in the surface state was observed.

Example 6

A polycarbonate resin composition was manufactured according to the procedure described in Example 1, except that, 0.75 parts by mass of WA-A was used instead of using the 0.035 parts by mass of WA-A in Example 1, and then the polycarbonate resin, which was dried in a clean oven, was injection molded to obtain a lens. No adhesion of contaminants or the like was observed on the mold of the injection molding machine. The optical characteristics of the obtained lens were measured and summarized in Table 1. Even after this lens was stored for 3 months at room temperature, no precipitation of a substance or the like was observed on the surface and no change in the surface state was observed.

Example 7

A polycarbonate resin composition was manufactured according to the procedure described in Example 1, except that, 0.3 parts by mass of WA-A was used instead of using the 0.035 parts by mass of WA-A in Example 1, and then the polycarbonate resin, which was dried in a clean oven, was injection molded to obtain a lens. No adhesion of contaminants or the like was observed on the mold of the injection molding machine. The optical characteristics of the obtained lens were measured and summarized in Table 1. Even after this lens was stored for 3 months at room temperature, no precipitation of a substance or the like was observed on the surface and no change in the surface state was observed.

Example 8

A polycarbonate resin composition was manufactured according to the procedure described in Example 1, except that, 100 parts by mass of polycarbonate resin 2 was used instead of using 100 parts by mass of polycarbonate resin 1 in Example 1, and then the polycarbonate resin, which was dried in a clean oven, was injection molded to obtain a lens. No adhesion of contaminants or the like was observed on the mold of the injection molding machine. The optical characteristics of the obtained lens were measured and summarized in Table 1. Even after this lens was stored for 3 months at room temperature, no precipitation of a substance or the like was observed on the surface and no change in the surface state was observed.

Example 9

A polycarbonate resin composition was manufactured according to the procedure described in Example 1, except that, 100 parts by mass of polycarbonate resin 2 and 0.020 parts by mass of UVA-A were used instead of using 100 parts by mass of polycarbonate resin 1 and 0.035 parts by mass of UVA-A, and then the polycarbonate resin, which was dried in a clean oven, was injection molded to obtain a lens. No adhesion of contaminants or the like was observed on the mold of the injection molding machine. The optical characteristics of the obtained lens were measured and summarized in Table 1. Even after this lens was stored for 3 months at room temperature, no precipitation of a substance or the like was observed on the surface and no change in the surface state was observed.

Comparative Example 1

100 parts by mass of polycarbonate resin 1, 0.6 parts by mass of UVA-E, and 0.02 parts by mass of a processing-heat stabilizer A were supplied by a quantitative feeder to a vented twin-screw extruder (TEX30a manufactured by Japan Steel Works Ltd., cylinder setting temperature: 260° C.) and foreign material was filtered through a filter, then, the result was discharged from a die in the form of strands, water-cooled and solidified, and then pelletized by a rotary cutter to obtain a polycarbonate resin composition. Thereafter, the polycarbonate resin composition was dried at 120° C. for 5 hours in a clean oven.

The polycarbonate resin composition was injection molded using an injection molding machine (SE-180DU manufactured by Sumitomo Heavy Industries, Ltd.) at a resin temperature of 280° C. and a mold temperature of 90° C. to mold a lens having a diameter of 75 mm and a thickness of 2 mm. The attachment of finely powdery contaminants was observed on the mold of the injection molding machine.

The spectral transmittance, total light transmittance, Haze, and YI values of the obtained lenses at 400 nm and 420 nm were measured and summarized in Table 1. After this lens was stored for 3 months, a powdery substance was precipitated on the surface, and appearance defects were observed.

Comparative Example 2

100 parts by mass of polycarbonate resin 3 and 0.020 parts by mass of UVA-A were supplied by a quantitative feeder to a vented twin-screw extruder (TEX30a manufactured by Japan Steel Works Ltd., cylinder setting temperature: 260° C.) and foreign material was filtered through a filter, then, the result was discharged from a die in the form of strands, water-cooled and solidified, and then pelletized by a rotary cutter to obtain a polycarbonate resin composition. Thereafter, the polycarbonate resin composition was dried at 120° C. for 5 hours in a clean oven.

The polycarbonate resin composition was injection molded using an injection molding machine (SE-180DU manufactured by Sumitomo Heavy Industries, Ltd.) at a resin temperature of 280° C. and a mold temperature of 90° C. to mold a lens having a diameter of 75 mm and a thickness of 2 mm. No adhesion of contaminants or the like was observed on the mold of the injection molding machine. The spectral transmittance, total light transmittance, Haze, and YI values of the obtained lenses at 400 nm and 420 nm were measured and summarized in Table 1. Even after this lens was stored for 3 months at room temperature, no precipitation of a substance or the like was observed on the surface and no change in the surface state was observed.

Comparative Example 3

100 parts by mass of polycarbonate resin 1 and 7.5 parts by mass of UVA-F, were supplied by a quantitative feeder to a vented twin-screw extruder (TEX30a manufactured by Japan Steel Works Ltd., cylinder setting temperature: 260° C.) and foreign material was filtered through a filter, then, the result was discharged from a die in the form of strands, water-cooled and solidified, and then pelletized by a rotary cutter to obtain a polycarbonate resin composition. Thereafter, the polycarbonate resin composition was dried at 120° C. for 5 hours in a clean oven.

The polycarbonate resin composition was injection molded using an injection molding machine (SE-180DU manufactured by Sumitomo Heavy Industries, Ltd.) at a resin temperature of 280° C. and a mold temperature of 90° C. to mold a lens having a diameter of 75 mm and a thickness of 2 mm. The attachment of finely powdery contaminants was observed on the mold of the injection molding machine.

The spectral transmittance, total light transmittance, Haze, and YI values of the obtained lenses at 400 nm and 420 nm were measured and summarized in Table 1. After this lens was stored for 3 months, a powdery substance was precipitated on the surface and appearance defects were observed.

Comparative Example 4

1.5 parts by mass of UVA-A was blended with 100 parts by mass of diethylene glycol bisallyl carbonate to which 3% of polymerization initiator IPP (diisopropylperoxydicarbonate) was added, the above were mixed and stirred, then subjected to vacuum degassing to prepare a liquid molding material. The liquid molding material was poured into a lens molding cavity having a thickness of 2 mm of a lens mold formed by setting a gasket on rims of convex and concave glass molds. The lens mold is heated at 40° C. for 3 hours, heated at 40 to 50° C. for 7 hours, heated at 50° C. to 80° C. for 9 hours, and further at 80° C. for 1 hour, cooled and then taken out and obtained molded product was annealed for 2 hours at 100° C. to obtain a lens. The spectral transmittance, total light transmittance, Haze, and YI values of the obtained lenses at 400 nm and 420 nm were measured and summarized in Table 1. After this lens was stored for 3 months, a powdery substance was precipitated on the surface and appearance defects were observed.

Example 10

100 parts by mass of polycarbonate resin 1, 0.035 parts by mass of UVA-A, 0.02 parts by mass of a processing-heat stabilizer A, and 10 ppm of a bluing agent A were supplied by a quantitative feeder to a vented twin-screw extruder (TEX30a manufactured by Japan Steel Works Ltd., cylinder setting temperature: 260° C.) and foreign material was filtered through a filter, then, the result was discharged from a die in the form of strands, water-cooled and solidified, and then pelletized by a rotary cutter to obtain a polycarbonate resin composition. Thereafter, the polycarbonate resin composition was dried at 120° C. for 5 hours in a clean oven.

The polycarbonate resin composition was injection molded using an injection molding machine (SE-180DU manufactured by Sumitomo Heavy Industries, Ltd.) at a resin temperature of 280° C. and a mold temperature of 90° C. to mold a lens having a diameter of 75 mm and a thickness of 2 mm. No adhesion of contaminants or the like was observed on the mold of the injection molding machine.

The optical characteristics of the obtained lens were measured and summarized in Table 1. Even after this lens was stored for 3 months at room temperature, no precipitation of a substance or the like was observed on the surface and no change in the surface state was observed.

Example 11

100 parts by mass of polycarbonate resin 1, 0.025 parts by mass of UVA-A, 0.02 parts by mass of a processing-heat stabilizer A, 0.4 parts by mass of UVA-F, and 10 ppm of a bluing agent were supplied by a quantitative feeder to a vented twin-screw extruder (TEX30a manufactured by Japan Steel Works Ltd., cylinder setting temperature: 260° C.) and foreign material was filtered through a filter, then, the result was discharged from a die in the form of strands, water-cooled and solidified, and then pelletized by a rotary cutter to obtain a polycarbonate resin composition. Thereafter, the polycarbonate resin composition was dried at 120° C. for 5 hours in a clean oven.

The polycarbonate resin composition was injection molded using an injection molding machine (SE-180DU manufactured by Sumitomo Heavy Industries, Ltd.) at a resin temperature of 280° C. and a mold temperature of 90° C. to mold a lens having a diameter of 75 mm and a thickness of 2 mm. No adhesion of contaminants or the like was observed on the mold of the injection molding machine.

The optical characteristics of the obtained lens were measured and summarized in Table 1. Even after this lens was stored for 3 months at room temperature, no precipitation of a substance or the like was observed on the surface and no change in the surface state was observed.

TABLE 1

|  | Example |  |  |  |  |  |  |  |
|---|---|---|---|---|---|---|---|---|
|  | 1 | 2 | 3 | 4 | 5 | 6 | 7 | 8 |
| Polycarbonate resin 1 (parts by mass) | 100 | 100 | 100 | 100 | 100 | 100 | 100 |  |
| Polycarbonate resin 2 (parts by mass) |  |  |  |  |  |  |  | 100 |
| Polycarbonate resin 3 (parts by mass) |  |  |  |  |  |  |  |  |
| ADC resin (parts by mass) |  |  |  |  |  |  |  |  |
| Ultraviolet absorber A (parts by mass) | 0.035 | 0.021 |  |  |  | 0.75 | 0.3 | 0.035 |
| Ultraviolet absorber B (parts by mass) |  |  | 0.021 |  |  |  |  |  |
| Ultraviolet absorber C (parts by mass) |  |  |  | 0.020 |  |  |  |  |
| Ultraviolet absorber D (parts by mass) |  |  |  |  | 0.020 |  |  |  |
| Ultraviolet absorber E (parts by mass) |  |  |  |  |  |  |  |  |
| Ultraviolet absorber F (parts by mass) |  |  |  |  |  |  |  |  |
| Processing-heat stabilizer A (parts by mass) |  |  |  |  |  |  |  |  |
| Bluing agent A |  |  |  |  |  |  |  |  |
| Spectral transmittance (%) at wavelength 400 nm | 0.35 | 0.35 | 0.34 | 0.35 | 0.34 | 0.00 | 0.00 | 0.10 |
| Spectral transmittance (%) at wavelength 420 nm | 7 | 14 | 15 | 14 | 15 | 0.09 | 0.3 | 6 |
| Spectral transmittance (%) at wavelength 450 nm | 84 | 89 | 83 | 74 | 88 | 52 | 76 | 84 |
| Total light transmittance (%) | 88 | 89 | 88 | 89 | 89 | 89 | 89 | 88 |
| Haze | 0.16 | 0.14 | 0.2 | 0.15 | 0.14 | 0.20 | 0.21 | 0.15 |
| Y.I. value | 11 | 9 | 8 | 9 | 10 | 35 | 32 | 15 |
| Impact resistance test of molded lens product | good | good | good | good | good | good | good | good |

|  | Example |  |  | Comparative Example |  |  |  |
|---|---|---|---|---|---|---|---|
|  | 9 | 10 | 11 | 1 | 2 | 3 | 4 |
| Polycarbonate resin 1 (parts by mass) |  | 100 | 100 | 100 |  | 100 |  |
| Polycarbonate resin 2 (parts by mass) | 100 |  |  |  |  |  |  |
| Polycarbonate resin 3 (parts by mass) |  |  |  |  |  | 100 |  |
| ADC resin (parts by mass) |  |  |  |  |  |  | 100 |
| Ultraviolet absorber A (parts by mass) | 0.020 | 0.035 | 0.025 |  | 0.02 |  | 1.5 |
| Ultraviolet absorber B (parts by mass) |  |  |  |  |  |  |  |
| Ultraviolet absorber C (parts by mass) |  |  |  |  |  |  |  |
| Ultraviolet absorber D (parts by mass) |  |  |  |  |  |  |  |

TABLE 1-continued

| | | | | | | | |
|---|---|---|---|---|---|---|---|
| Ultraviolet absorber E (parts by mass) | | | | 0.6 | | | |
| Ultraviolet absorber F (parts by mass) | | | 0.4 | | | 7.5 | |
| Processing-heat stabilizer A (parts by mass) | | 0.02 | 0.02 | 0.02 | | | |
| Bluing agent A | | 10 ppm | 10 ppm | | | | |
| Spectral transmittance (%) at wavelength 400 nm | 0.10 | 0.20 | 0.10 | 0.50 | 0.35 | 0.62 | 0.12 |
| Spectral transmittance (%) at wavelength 420 nm | 10 | 6 | 5 | 40 | 15 | 38 | 0.06 |
| Spectral transmittance (%) at wavelength 450 nm | 86 | 83 | 84 | 91 | 89 | 91 | 0.2 |
| Total light transmittance (%) | 89 | 83 | 83 | 88 | 89 | 85 | 80 |
| Haze | 0.12 | 0.17 | 0.14 | 0.21 | 0.14 | 0.50 | 4 |
| Y.I. value | 13 | 10 | 6 | 6 | 8 | 14 | 43 |
| Impact resistance test of molded lens product | good | good | good | good | poor | poor | poor |

From the results described in Table 1, it was confirmed that the lens according to the present invention sufficiently shields ultraviolet and visible light having a wavelength of 400 nm and a wavelength of 420 nm while having a high total light transmittance, excellent transparency and color, and also high impact resistance. Furthermore, it was confirmed that mold contamination was suppressed. In addition, the lens of the present invention was also excellent in storage stability without any change in the surface state after aging.

This application claims priority based on Japanese Patent Application No. 2017-099723 filed on May 19, 2017, the entire disclosure of which is incorporated herein.

The invention claimed is:

1. A lens comprising:
an indole-based compound represented by General Formula (1), and
a polycarbonate resin having a weight average molecular weight of 40,000 to 60,000,
wherein the content of the indole-based compound is 0.01 to 0.1 parts by mass with respect to 100 parts by mass of the polycarbonate resin,

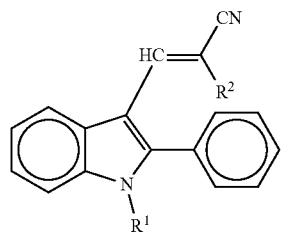

(1)

wherein in the formula, $R^1$ represents an alkyl group or an aralkyl group which optionally be branched, $R^2$ represents —CN or —COOR$^3$, wherein $R^3$ represents an alkyl group or aralkyl group which optionally have a substituent, and
wherein the polycarbonate resin is a bisphenol A polycarbonate.

2. The lens according to claim 1,
wherein a spectral transmittance at a wavelength of 420 nm or less is 0 to 20%, at a thickness of 2 mm.

3. The lens according to claim 1,
wherein a spectral transmittance at a wavelength of 420 nm or less is 0 to 20% and a spectral transmittance at a wavelength of 450 nm is 50% or more, at a thickness of 2 mm.

4. The lens according to claim 1, further comprising:
a bluing agent.

5. The lens according claim 1, further comprising:
an ultraviolet absorber other than the indole-based compound represented by General Formula (1).

6. The lens according to claim 1, further comprising:
an antioxidant and/or a processing-heat stabilizer.

7. A resin composition comprising:
an indole-based compound represented by General Formula (1), and
a polycarbonate resin having a weight average molecular weight of 40,000 to 60,000,
wherein the content of the indole-based compound is 0.01 to 0.1 parts by mass with respect to 100 parts by mass of the polycarbonate resin,

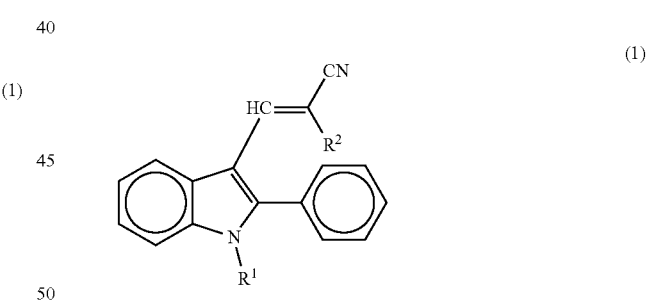

(1)

wherein in the formula, le represents an alkyl group or an aralkyl group which optionally be branched, $R^2$ represents —CN or —COOR$^3$, wherein $R^3$ represents an alkyl group or an aralkyl group which optionally have a substituent, and
wherein the polycarbonate resin is a bisphenol A polycarbonate.

8. A method of manufacturing a lens, comprising:
molding by injection molding a resin composition including 0.01 to 0.1 parts by mass of an indole-based compound represented by General Formula (1) with respect to 100 parts by mass of a polycarbonate resin having a weight average molecular weight of 40,000 to 60,000,

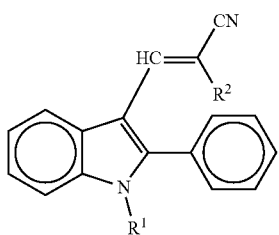

(1)

wherein in the formula, $R^1$ represents an alkyl group or an aralkyl group which optionally be branched, $R^2$ represents —CN or —COOR$^3$, and $R^3$ represents an alkyl group or aralkyl group which optionally have a substituent, and wherein the polycarbonate resin is a bisphenol A polycarbonate.

9. The lens according to claim 1,
wherein the weight average molecular weight of the polycarbonate resin is 40,000 to 50,000.

10. The lens according to claim 1,
wherein the indole-based compound is obtained by subjecting a compound represented by General Formula (2) to a condensation reaction with malononitrile of formula NC—CH$_2$—CN or α-cyanoacetic acid ester of NC—CH$_2$—COOR$^3$; wherein R$^3$ is the same as R$^3$ of Formula (1)

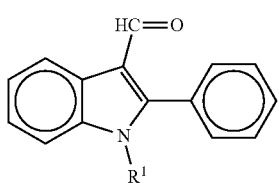

(2)

wherein $R^1$ is the same as $R^1$ of Formula (1).

11. The lens according to claim 10,
wherein the indole-based compound is at least one selected from the group consisting of ethyl-2-cyano-3-(1N-methyl-2-phenyl-1H-indol-3-yl) acrylate, 2-[(1N-butyl-2-phenyl-1H-indol-3-yl)methylene] malononitrile, ethyl-2-cyano-3-(1N-benzyl-2-phenyl-1H-indol-3-yl) acrylate and benzyl-2-cyano-3-(1N-methyl-2-phenyl-1H-indol-3-yl) acrylate.

12. The lens according to claim 1,
wherein the content of the indole-based compound is 0.02 to 0.1 parts by mass with respect to 100 parts by mass of the polycarbonate resin.

13. The lens according to claim 1,
wherein the weight average molecular weight of the polycarbonate resin is 40,000 to 50,000,
wherein the indole-based compound is at least one selected from the group consisting of ethyl-2-cyano-3-(1N-methyl-2-phenyl-1H-indol-3-yl) acrylate, 2-[(1N-butyl-2-phenyl-1H-indol-3-yl)methylene] malononitrile, ethyl-2-cyano-3-(1N-benzyl-2-phenyl-1H-indol-3-yl) acrylate and benzyl-2-cyano-3-(1N-methyl-2-phenyl-1H-indol-3-yl) acrylate, and
wherein the content of the indole-based compound is 0.02 to 0.1 parts by mass with respect to 100 parts by mass of the polycarbonate resin.

14. The lens according to claim 1,
wherein in the indole-based compound represented by the General Formula (1), $R^1$ is at least one selected from the group consisting of a methyl group, an ethyl group, an (iso)butyl group, a t-butyl group, a hexyl group, an octyl group, a 2-ethylhexyl group, a dodecyl group and a benzyl group, $R^3$ is at least one selected from the group consisting of a methyl group, an ethyl group, an (iso)butyl group, a t-butyl group, a hexyl group, an octyl group, a 2-ethylhexyl group, a dodecyl group, a benzyl group, a β-cyanoethyl group, a β-chloroethyl group, an ethoxypropyl group, a hydroxyalkyl group, and an alkoxyalkoxyalkyl group.

15. The lens according to claim 1,
wherein the weight average molecular weight of the polycarbonate resin is 40,000 to 50,000,
wherein in the indole-based compound represented by the General Formula (1), $R^1$ is at least one selected from the group consisting of a methyl group, an ethyl group, an (iso)butyl group, a t-butyl group, a hexyl group, an octyl group, a 2-ethylhexyl group, a dodecyl group and a benzyl group, $R^3$ is at least one selected from the group consisting of a methyl group, an ethyl group, an (iso)butyl group, a t-butyl group, a hexyl group, an octyl group, a 2-ethylhexyl group, a dodecyl group, a benzyl group, a β-cyanoethyl group, a β-chloroethyl group, an ethoxypropyl group, a hydroxyalkyl group, and an alkoxyalkoxyalkyl group, and
wherein the content of the indole-based compound is 0.02 to 0.1 parts by mass with respect to 100 parts by mass of the polycarbonate resin.

* * * * *